US009596452B2

(12) United States Patent
Gharib et al.

(10) Patent No.: US 9,596,452 B2
(45) Date of Patent: *Mar. 14, 2017

(54) DEFOCUSING FEATURE MATCHING SYSTEM TO MEASURE CAMERA POSE WITH INTERCHANGEABLE LENS CAMERAS

(71) Applicant: CALIFORNIA INSTITUTE OF TECHNOLOGY, Pasadena, CA (US)

(72) Inventors: Morteza Gharib, Altadena, CA (US); Jian Lu, Laguna Hills, CA (US); Scott Hsieh, Anaheim, CA (US); Francisco Pereira, Rome (IT); Alexei Harvard, Pasadena, CA (US); David Jeon, Pasadena, CA (US)

(73) Assignee: CALIFORNIA INSTITUTE OF TECHNOLOGY, Pasadena, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/303,988

(22) Filed: Jun. 13, 2014

(65) Prior Publication Data

US 2014/0368617 A1     Dec. 18, 2014

Related U.S. Application Data

(63) Continuation of application No. 12/853,181, filed on Aug. 9, 2010, now Pat. No. 8,773,507.

(Continued)

(51) Int. Cl.
*H04N 13/02* (2006.01)
*G02B 7/34* (2006.01)
(Continued)

(52) U.S. Cl.
CPC .......... *H04N 13/0203* (2013.01); *G02B 7/34* (2013.01); *G03B 9/02* (2013.01); *G03B 17/14* (2013.01);
(Continued)

(58) Field of Classification Search
CPC .......... G02B 7/34; G03B 7/14; G03B 17/565; G03B 19/12; G03B 35/00; G03B 9/02;
(Continued)

(56) References Cited

U.S. PATENT DOCUMENTS 4,101,917 A    7/1978 Ueda
4,264,921 A    4/1981 Pennington et al.
(Continued)

FOREIGN PATENT DOCUMENTS

EP    1175106 A2    1/2002
GB    2242270 A     3/1991
(Continued)

OTHER PUBLICATIONS

Horstmeyer et al., Pupil plane multiplexing for multi-domain imaging sensors, 2008, The MITRE Corp. & Univ. of California/San Diego, pp. 10.*
(Continued)

*Primary Examiner* — Sath V Perungavoor
*Assistant Examiner* — Peter D Le
(74) *Attorney, Agent, or Firm* — One LLP

(57) ABSTRACT

A lens and aperture device for determining 3D information. An SLR camera has a lens and aperture that allows the SLR camera to determine defocused information.

13 Claims, 3 Drawing Sheets

Related U.S. Application Data

(60) Provisional application No. 61/232,947, filed on Aug. 11, 2009.

(51) Int. Cl.
  *G03B 9/02* (2006.01)
  *G03B 19/12* (2006.01)
  *G03B 35/00* (2006.01)
  *H04N 5/235* (2006.01)
  *H04N 9/04* (2006.01)
  *G03B 17/14* (2006.01)
  *G03B 17/56* (2006.01)

(52) U.S. Cl.
  CPC ........... *G03B 17/565* (2013.01); *G03B 19/12* (2013.01); *G03B 35/00* (2013.01); *H04N 5/235* (2013.01); *H04N 5/2356* (2013.01); *H04N 9/045* (2013.01)

(58) Field of Classification Search
  CPC .. H04N 13/0203; H04N 5/235; H04N 5/2356; H04N 9/045
  See application file for complete search history.

(56) References Cited

U.S. PATENT DOCUMENTS

| | | |
|---|---|---|
| 4,512,656 A | 4/1985 | Shinoda et al. |
| 4,650,466 A | 3/1987 | Luther |
| 4,727,471 A | 2/1988 | Driels et al. |
| 4,879,664 A | 11/1989 | Suyama et al. |
| 4,948,258 A | 8/1990 | Caimi |
| 5,018,854 A | 5/1991 | Rioux |
| 5,031,154 A | 7/1991 | Watanabe |
| 5,071,407 A | 12/1991 | Termin et al. |
| 5,075,561 A | 12/1991 | Rioux |
| 5,168,327 A | 12/1992 | Yamawaki |
| 5,206,498 A | 4/1993 | Sensui |
| 5,216,695 A | 6/1993 | Ross et al. |
| 5,222,971 A | 6/1993 | Willard et al. |
| 5,235,857 A | 8/1993 | Anderson |
| 5,270,795 A | 12/1993 | Blais |
| 5,351,078 A | 9/1994 | Lemelson |
| 5,373,151 A | 12/1994 | Eckel, Jr. et al. |
| 5,476,100 A | 12/1995 | Galel |
| 5,496,277 A | 3/1996 | Termin et al. |
| 5,527,282 A | 6/1996 | Segal |
| 5,579,444 A | 11/1996 | Dalziel et al. |
| 5,604,344 A | 2/1997 | Finarov |
| 5,714,762 A | 2/1998 | Li et al. |
| 5,745,067 A | 4/1998 | Chou et al. |
| 5,864,359 A | 1/1999 | Kazakevich |
| 5,922,961 A | 7/1999 | Hsu et al. |
| 5,928,260 A | 7/1999 | Chin et al. |
| 5,986,694 A | 11/1999 | Iino |
| 6,045,623 A | 4/2000 | Cannon |
| 6,112,029 A | 8/2000 | Suda |
| 6,115,553 A | 9/2000 | Iwamoto |
| 6,157,747 A | 12/2000 | Szeliski et al. |
| 6,229,913 B1 | 5/2001 | Nayar et al. |
| 6,229,959 B1 | 5/2001 | Suda et al. |
| 6,262,803 B1 | 7/2001 | Hallerman et al. |
| 6,271,918 B2 | 8/2001 | Blais |
| 6,278,847 B1 | 8/2001 | Gharib et al. |
| 6,304,284 B1 | 10/2001 | Dunton et al. |
| 6,344,048 B1 | 2/2002 | Chin et al. |
| 6,519,359 B1 | 2/2003 | Nafis et al. |
| 6,545,701 B2 | 4/2003 | Sinclair et al. |
| 6,563,543 B1 | 5/2003 | Doron |
| 6,711,293 B1 | 3/2004 | Lowe |
| 6,748,112 B1 | 6/2004 | Nguyen et al. |
| 6,750,904 B1 | 6/2004 | Lambert |
| 6,765,569 B2 | 7/2004 | Neumann et al. |
| 6,912,293 B1 | 6/2005 | Korobkin |
| 6,915,008 B2 | 7/2005 | Barman et al. |
| 6,943,349 B2 | 9/2005 | Adamec et al. |
| 6,955,656 B2 | 10/2005 | Bergheim et al. |
| 6,965,690 B2 | 11/2005 | Matsumoto |
| 7,006,132 B2 | 2/2006 | Pereira et al. |
| 7,106,375 B2 | 9/2006 | Venturino et al. |
| 7,171,054 B2 | 1/2007 | Fiete et al. |
| 7,236,622 B2 | 6/2007 | Chen et al. |
| 7,260,274 B2 | 8/2007 | Sawhney et al. |
| 7,271,377 B2 | 9/2007 | Mueller et al. |
| 7,340,077 B2 | 3/2008 | Gokturk et al. |
| 7,372,642 B2 | 5/2008 | Rohaly et al. |
| 7,423,666 B2 | 9/2008 | Sakakibara et al. |
| 7,496,226 B2 | 2/2009 | Negahdaripour et al. |
| 7,565,029 B2 | 7/2009 | Zhou et al. |
| 7,605,817 B2 | 10/2009 | Zhang et al. |
| 7,612,869 B2 | 11/2009 | Pereira et al. |
| 7,612,870 B2 | 11/2009 | Graff et al. |
| 7,668,388 B2 | 2/2010 | Bryll |
| 7,715,018 B2 | 5/2010 | Gharib et al. |
| 7,715,918 B2 | 5/2010 | Melvin |
| 7,747,151 B2 | 6/2010 | Kochi et al. |
| 7,819,591 B2 | 10/2010 | Rohaly et al. |
| 7,826,067 B2 | 11/2010 | Gharib et al. |
| 7,894,078 B2 | 2/2011 | Gharib et al. |
| 7,916,309 B2 | 3/2011 | Gharib et al. |
| 8,089,635 B2 | 1/2012 | Gharib et al. |
| 8,179,424 B2 | 5/2012 | Moller |
| 8,190,020 B2 | 5/2012 | Numako et al. |
| 8,472,032 B2 | 6/2013 | Gharib et al. |
| 8,514,268 B2 | 8/2013 | Gharib et al. |
| 8,576,381 B2 | 11/2013 | Gharib et al. |
| 8,619,126 B2 | 12/2013 | Gharib et al. |
| 8,773,507 B2 | 7/2014 | Gharib et al. |
| 2001/0031920 A1 | 10/2001 | Kaufman et al. |
| 2002/0038120 A1 | 3/2002 | Duhaylongsod et al. |
| 2003/0025811 A1 | 2/2003 | Keelan et al. |
| 2003/0096210 A1 | 5/2003 | Rubbert et al. |
| 2003/0125719 A1 | 7/2003 | Furnish |
| 2003/0160970 A1 | 8/2003 | Basu et al. |
| 2003/0210407 A1 | 11/2003 | Xu |
| 2004/0136567 A1 | 7/2004 | Billinghurst et al. |
| 2004/0155975 A1 | 8/2004 | Hart et al. |
| 2005/0025116 A1 | 2/2005 | Chen et al. |
| 2005/0104879 A1 | 5/2005 | Kaye et al. |
| 2005/0119684 A1 | 6/2005 | Guterman et al. |
| 2005/0168616 A1 | 8/2005 | Rastegar et al. |
| 2005/0251116 A1 | 11/2005 | Steinke et al. |
| 2005/0264668 A1 | 12/2005 | Miyamoto |
| 2006/0044546 A1 | 3/2006 | Lewin et al. |
| 2006/0092314 A1 | 5/2006 | Silverstein et al. |
| 2006/0098872 A1 | 5/2006 | Seo et al. |
| 2006/0209193 A1 | 9/2006 | Pereira et al. |
| 2006/0228010 A1 | 10/2006 | Rubbert et al. |
| 2006/0285741 A1 | 12/2006 | Subbarao |
| 2007/0008312 A1 | 1/2007 | Zhou et al. |
| 2007/0056768 A1 | 3/2007 | Hsieh et al. |
| 2007/0076090 A1 | 4/2007 | Alexander |
| 2007/0078500 A1 | 4/2007 | Ryan et al. |
| 2007/0146700 A1 | 6/2007 | Kowarz et al. |
| 2007/0188769 A1 | 8/2007 | Rohaly et al. |
| 2007/0195162 A1 | 8/2007 | Graff et al. |
| 2007/0236694 A1 | 10/2007 | Gharib et al. |
| 2008/0031513 A1 | 2/2008 | Hart |
| 2008/0091691 A1 | 4/2008 | Tsuji |
| 2008/0180436 A1 | 7/2008 | Kraver |
| 2008/0201101 A1 | 8/2008 | Hebert et al. |
| 2008/0218604 A1 | 9/2008 | Shikano et al. |
| 2008/0239316 A1 | 10/2008 | Gharib et al. |
| 2008/0259354 A1 | 10/2008 | Gharib et al. |
| 2008/0278570 A1 | 11/2008 | Gharib et al. |
| 2008/0278572 A1 | 11/2008 | Gharib et al. |
| 2008/0278804 A1 | 11/2008 | Gharib et al. |
| 2009/0016642 A1 | 1/2009 | Hart |
| 2009/0129667 A1 | 5/2009 | Ho et al. |
| 2009/0238449 A1 | 9/2009 | Zhang et al. |
| 2009/0295908 A1 | 12/2009 | Gharib et al. |
| 2010/0007718 A1 | 1/2010 | Rohaly, Jr. et al. |

(56) References Cited

U.S. PATENT DOCUMENTS

| | | | |
|---|---|---|---|
| 2010/0094138 | A1 | 4/2010 | Gharib et al. |
| 2011/0074932 | A1 | 3/2011 | Gharib et al. |

FOREIGN PATENT DOCUMENTS

| | | | |
|---|---|---|---|
| JP | 2655885 B2 | 9/1997 | |
| JP | 2001-16610 | 8/2002 | |
| JP | 2001-61165 | 9/2002 | |
| JP | 2003-289293 | 10/2003 | |
| JP | 2004-191240 | 7/2004 | |
| WO | WO 88/00710 A1 | 1/1988 | |
| WO | WO 96/41304 A1 | 12/1996 | |
| WO | WO 00/69357 A1 | 11/2000 | |
| WO | WO 01/86281 A1 | 11/2001 | |
| WO | WO 02/096478 A2 | 12/2002 | |
| WO | WO 2006/009786 A2 | 1/2006 | |
| WO | WO 2007/041542 A2 | 4/2007 | |
| WO | WO 2007/056768 A2 | 5/2007 | |
| WO | WO 2007/095307 A1 | 8/2007 | |
| WO | WO 2007/130122 A2 | 11/2007 | |
| WO | WO 2008/091691 A1 | 7/2008 | |

OTHER PUBLICATIONS

Bando, Y., "How to Disassemble the Canon EF 50mm f/1.8 II Lens", 2008, pp. 1-21.
Chang, N. L., Efficient Dense Correspondences using Temporally Encoded Light Patterns, IEEE, Oct. 12, 2003.
Dellaert, F., et al., Structure from Motion without Correspondence, Computer Vision & Pattern Recognition, 2000.
El-Hakim S.F., et al., A System for Indoor 3-D Mapping and Virtual Environments, Proceedings of the SPIE, 1997.
Favaro, P., et al., "Observing Shape from Defocused Images", Int'l Journal of Computer Vision, vol. 52, No. 1, 2003, pp. 25-43.
Guarnieri, A., et al., "3D Modeling of Real Artistic Objects with Limited Computers Resources", Proc. Of XVIII CIPA Symposium on Architectural & Archaeological Photogrammetry, Oct. 1999.
Hasinoff, S.W, "Variable-Aperture Photography", Graduate Department of Computer Science, University of Toronto, Thesis submitted in 2008, pp. 1-180.
Horn, E., et al., Toward Optimal Structured Light Patterns, 3DIM, 1997.
Koninckx, T.P., et al., A. Graph Cut based Adaptive Structured Light approach for real-time Range Acquisition, 3EDPVT, 2004.
Kordelas, G., et al., State-of-the-art Algorithms for Complete 3D Model Reconstruction, "Engage" Summer School, 2010.
Lepetit, V., et al., "Monocular Model-Based 3D Tracking of Rigid Objects: A Survey", Foundation and Trends in Computer Graphics and Vision, vol. 1, No. 1, 2005, pp. 1-89.
Levenberg, K., "A Method for the Solution of Certain Non-Linear Problems in Least Squares", Quarterly of Applied Mathematics, vol. II, No. 2, Jul. 1944.
Levin, A., et al., "Image and Depth from a Conventional Camera with a Coded Aperture", ACM Transactions on Graphics, vol. 26, No. 3, Jul. 1999, pp. 70-1-70-9.
Li, S.Z., Markov Random Field Models in Computer Vision, Springer-Verlag, 1995.
Lowe, D.G., Three-Dimensional Object Recognition from Single Two-Dimensional Images, Artificial Intelligence, vol. 31, No. 3, Mar. 1987, pp. 355-395.
Lowe, D.G., Object Recognition from Local Scale-Invariant Features, Proc. of the Int'l Conference on Computer Vision, Sep. 1999.
Makadia, A., et al., Fully Automatic Registration of 3D Point Clouds, Proceedings of the 2006 IEEE Computer Society Conference on Computer Vision and Pattern Recognition, 2006.
Marquardt, D.W., An Algorithm for Least-Squares Estimation of Nonlinear Parameters, Journal of the Society for Industrial and Applied Mathematics, vol. 11, No. 2, Jun. 1963, pp. 431-441.
Mouaddib, E., et al., Recent Progress in Structured Light in order to Solve the Correspondence Problem in Stereo Vision, Proceedings of the 1997 IEEE, Apr. 1997.
Neugebauer, P.J., Geometrical Cloning of 3D Objects via Simultaneous Registration of Multiple Range Images, Shape Modeling & Application, Mar. 1997.
Nguyen, V.A., et al., Detection of the depth order of defocused images, Vision Research 45, 2005, pp. 1003-1011.
Pagés, J., et al., "Implementation of a Robust Coded Structured Light Technique for Dynamic 3D Measurements", ICIP, 2003.
Pereira, F., et al., "Two-frame 3D particle tracking", Measurement Science and Technology, vol. 17, 2006, pp. 1680-1692.
Raji, A., et al., "PixelFlex2: A Comprehensive, Automatic, Casually-Aligned Multi-Projector Display", PROCAMS, 2003.
Raskar, R., et al., Multi-Projector Displays Using Camera-Based Registration, IEEE Visualization, 1999.
Rocchini, C., et al., A low cost 3D scanner based on structured light, Computer Graphics Forum (Eurographics 2001 Conf. Issue).
Rusinkiewicz, S., et al., Real-Tiime 3D Model Acquisition, ACM Transactions on Graphics, 2002.
Salvi, J., et al., Pattern codification strategies in structured light systems, Pattern Recognition, 2004.
Scharstein, D., et al., A Taxonomy and Evaluation of Dense Two-Frame Stereo Correspondence Algorithms, IJCV, 2002.
Scharstein, D., et al., "High-Accuracy Stereo Depth Maps Using Structured Light", IEEE Computer Society Conf. on Computer Vision and Pattern Recognition, 2003, vol. 1, pp. 195-202.
Sinofsky, "Measurement of Laser Beam Spreading in Biological Tissue Scattering", SPIE, vol. 712, Lasers in Medicine (1986).
Smith, E.R., et al., "Registration of combined range-intensity scans: Initialization through Verification", Computer Vision and Image Understanding, vol. 110, 2008, pp. 226-244.
Subbarao, M., et al., "Analysis of Defocused Image Data for 3D Shape Recovery using a Regularization Technique", SPIE, 1997.
Tardif, J., "Multi-projectors for arbitrary surfaces without explicit calibration and reconstruction", DIM, 2003.
Tardif, J., et al., "A MRF formulation for coded structured light", Proceedings of the $5^{th}$ Int'l Conf. on 3-D Digital Imaging & Modeling, 2005.
Wang, Z., et al., "Extraction of the Corner of Checkerboard image", Proceedings of the 7th World Congress on Intelligent Control and Automation, Jun. 25-27, 2008.
Weisstein, E., Gray Code, http://mathworld.wolfram.com/GrayCode.html.
Willert, C.E., et al., "Three-dimensional particle imaging with a single camera", Experiments in Fluids, vol. 12, 1992, pp. 353-358.
Williams, J.A., et al., "Multiple View 3D Registration: A Review and a New Technique", Systems Man. & Cybernetics, vol. 10, 1999.
Wu, M., et al., "Three-dimensional fluorescent particle tracking at micron-scale using a single Camera", Experiments in Fluids, 2005, pp. 461-465.
Yang, R., et al., PixelFlex: A Reconfigurable Multi-Projector Display System, IEEE Visualization, 2001.
Zhang, S., et al., High-resolution, Real-time 3D Shape Acquisition, IEEE Workshop of real-time 3D sensors & their uses, 2004.
WO PCT/US2008/000991 ISR, Jul. 28, 2009.
WO PCT/US2008/000882 ISR, Jul. 5, 2009.
WO PCT/US2005/021326 ISR, Feb. 1, 2007.
WO PCT/US2009/004362 ISR, May 27, 2010.
AU 2008244494 Examiner's First Report, Aug. 18, 2010.
Battle, J., et al., "Recent Progress in Coded Structured Light as a Technique to Solve The Correspondence Problem: A Survey", Pattern Recognition, 1998, vol. 31, No. 7, pp. 963-982.
Kießling, A.,"A Fast Scanning Method for Three-Dimensional Scenes", IEEE Proceedings $3^{rd}$ International Conference on Pattern Recognition, 1976, pp. 586-589.
WO PCT/US2007/008598 ISR, Apr. 11, 2008.
WO PCT/US2007/008598 IPRP, Oct. 8, 2008.
WO PCT/US2008/000991 ISR, May 21, 2008.
WO PCT/US2008/000991 IPRP, Jul. 28, 2009.
WO PCT/US2008/000882 ISR, Mar. 20, 2009.
WO PCT/US2008/000882 IPRP, Jul. 28, 2009.
WO PCT/US2008/005311 ISR, Sep. 8, 2008.

(56) References Cited

OTHER PUBLICATIONS

WO PCT/US2008/005311 IPRP, Oct. 27, 2009.
WO PCT/US2008/005313 ISR, Sep. 8, 2008.
WO PCT/US2008/005313 IPRP, Oct. 27, 2009.
WO PCT/US2008/005314 ISR, Sep. 8, 2008.
WO PCT/US2008/005314 IPRP, Oct. 27, 2009.
WO PCT/US2008/005315 ISR, Sep. 8, 2008.
WO PCT/US2008/005315 IPRP, Oct. 27, 2009.
WO PCT/US2008/012947 ISR, Jul. 14, 2009.
WO PCT/US2008/012947 IPRP, May 25, 2010.
WO PCT/US2009/003167 ISR, Oct. 29, 2010.
WO PCT/US2009/003167 IPRP, Mar. 1, 2011.
WO PCT/US2009/004362 ISR, Apr. 8, 2010.
WO PCT/US2009/004362 IPRP, Jan. 25, 2011.
WO PCT/US2010/046908 ISR, Apr. 29, 2011.
WO PCT/US2010/046908 IPRP, Feb. 28, 2012.
WO PCT/US2010/057532 ISR, Oct. 25, 2011.
WO PCT/US2010/057532 IPRP, Mar. 5, 2013.
WO PCT/US2011/032580 ISR, Jul. 7, 2011.
WO PCT/US2011/032580 IPRP, Oct. 23, 2012.
WO PCT/US2012/046557 ISR, Oct. 2, 2012.
WO PCT/US2012/046557 IPRP, Jan. 13, 2015.
WO PCT/US2012/046484 ISR, Sep. 24, 2012.
WO PCT/US2012/046484 IPRP, Jan. 13, 2015.

\* cited by examiner

DEFOCUSING FEATURE MATCHING SYSTEM TO MEASURE CAMERA POSE WITH INTERCHANGEABLE LENS CAMERAS

CROSS-REFERENCE TO RELATED APPLICATIONS

This application is a continuation of U.S. patent application Ser. No. 12/853,181, filed Aug. 9, 2010, which claims priority from provisional application No. 61/232,947, filed Aug. 11, 2009, both of which are incorporated by reference herein in their entireties and for all purposes.

BACKGROUND

Different techniques are known for three dimensional imaging.

It is known to carry out three dimensional particle imaging with a single camera. This is also called quantitative volume imaging. One technique, described by Willert and Gharib uses a special defocusing mask relative to the camera lens. This mask is used to generate multiple images from each scattering site on the item to be imaged. This site can include particles, bubbles or any other optically-identifiable image feature. The images are then focused onto an image sensor e.g. a charge coupled device, CCD. This system allows accurately, three dimensionally determining the position and size of the scattering centers.

Another technique is called aperture coded imaging. This technique uses off-axis apertures to measure the depth and location of a scattering site. The shifts in the images caused by these off-axis apertures are monitored, to determine the three-dimensional position of the site or sites.

U.S. Pat. No. 7,006,132 describes a geometric analysis in which a camera lens of focal length f is located at z=0. Two small apertures are placed within the lens, separated a distance d/2 away from the optical centerline which also corresponds to the z axis.

U.S. Pat. No. 7,006,132 describes using lens laws and self similar triangle analysis to find the geometrical center ($X_0$, $Y_0$) of the image pair, and then to solve for the image separation.

More generally, this can determine the pose of a camera that is obtaining the information, and the information from the camera, to determine 3D information about structures that is pieced together from multiple different images. US 2009/0295908 describes how camera pose can be simultaneously measured by using an additional set of apertures that measure a pose of the camera relative to the object when using a feature matching algorithm, using the same apertures that are used for defocusing.

There are often tradeoffs in aperture coding systems.

SUMMARY

The present application describes a lens system and assembly that is intended for attachment to an SLR camera or other camera with a replaceable lens assembly, and which includes coded apertures of a type that can be used for determining defocus information.

An embodiment describes using a camera for taking pictures and also for obtaining 3D information.

DETAILED DESCRIPTION

A camera system is used with a conventional lens in a first embodiment to obtain a picture, and with a special lens assembly in a second embodiment to obtain defocused information. In the second embodiment, the lens and camera assembly is used with a computer to reconstruct a three-dimensional (3D) object from a number of different pictures at different camera orientations. The measuring camera can be handheld or portable. In one embodiment, the camera is handheld, and the computer reconstruct information indicative of the camera pose in order to stitch together information from a number of different camera exposures.

A system using defocusing to measure 3D objects was described by Willert & Gharib in 1992 using a feature matching system such as the Scale Invariant Feature Transform (SIFT) or an error minimization method (such as the Levenberg-Marquardt) method. This is described in general in US 2009/0295908, entitled "Method and Device for High Resolution Three Dimensional Imaging Which Obtains Camera Pose Using Defocusing."

However, the inventors realized that this could be improved in a measuring camera which has interchangeable lenses. An embodiment describes how this system would be used in interchangeable lens cameras, such as C mount video cameras and single lens reflex (SLR) cameras. More generally, any camera of any type which has interchangeable lenses can be used for this.

Figure 1:
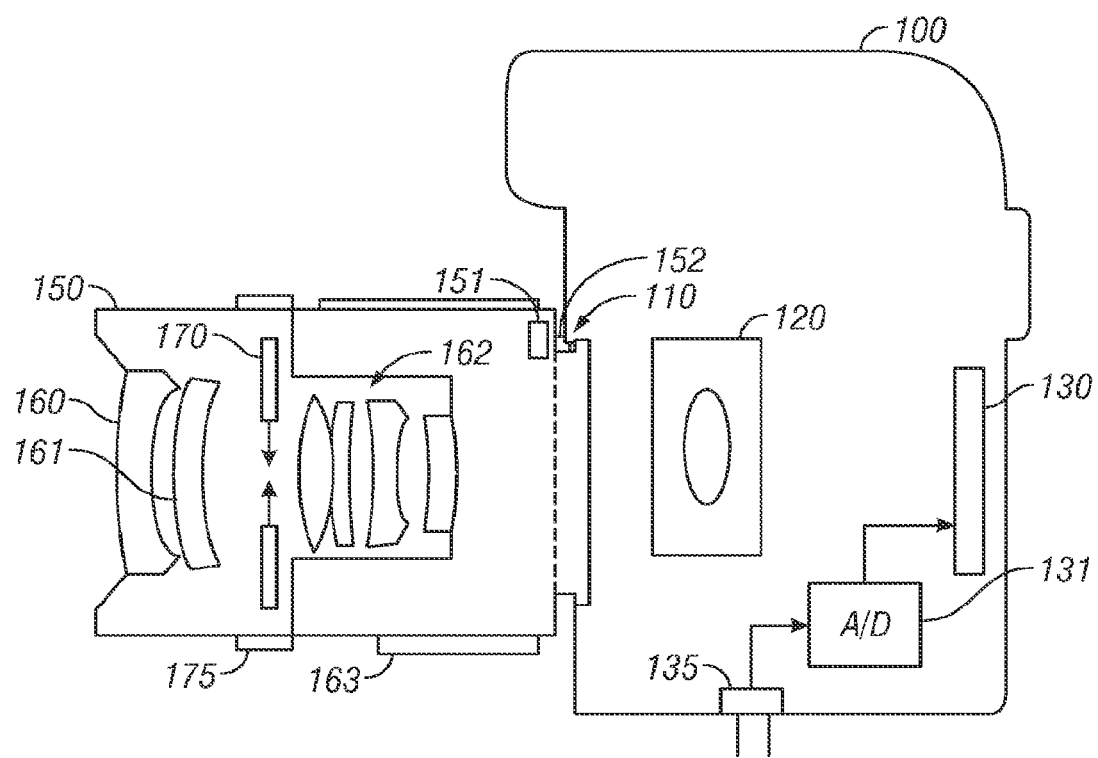
FIG. 1 shows the camera with a picture taking lens.

A first embodiment is shown in FIG. 1. An SLR 100 has a lens attachment part 110, an optical train 120 inside the camera, and an imager 130. The imager, may be, for example, any kind of imager such as a CMOS image sensor or the like. A number of auxiliary equipment such as an A/D converter 131 may convert the output of the imager 130 into a form which can be electronically processed and which is output through the USB port 135. In another embodiment, the output may be wireless. Also included within the camera, but not shown, is structure for carrying out automatically focusing automatic exposures and the like. The lens assembly 150 is connected to the attachment part 110. In one embodiment, the lens may include coded information 151 which indicates the type of lens, and which is communicated through an electronic detector connection 152 to the camera body 100. This may be a chip or may simply be a hardwired connection. The lens itself includes an objective lens portion 160, along with lens groups 161, 162. Focusing may be carried out by adjusting the distance between the lens groups 161, 162 using a manual or automatic focus device 163 which adjusts this distance. The camera also includes, as conventional, an aperture device 170 which is controllable by a control 175 that may open and close the size of the aperture. The aperture device may be a ring with sliding blades that open and close to adjust the diameter of the aperture opening, for example, an iris.

Figure 2:
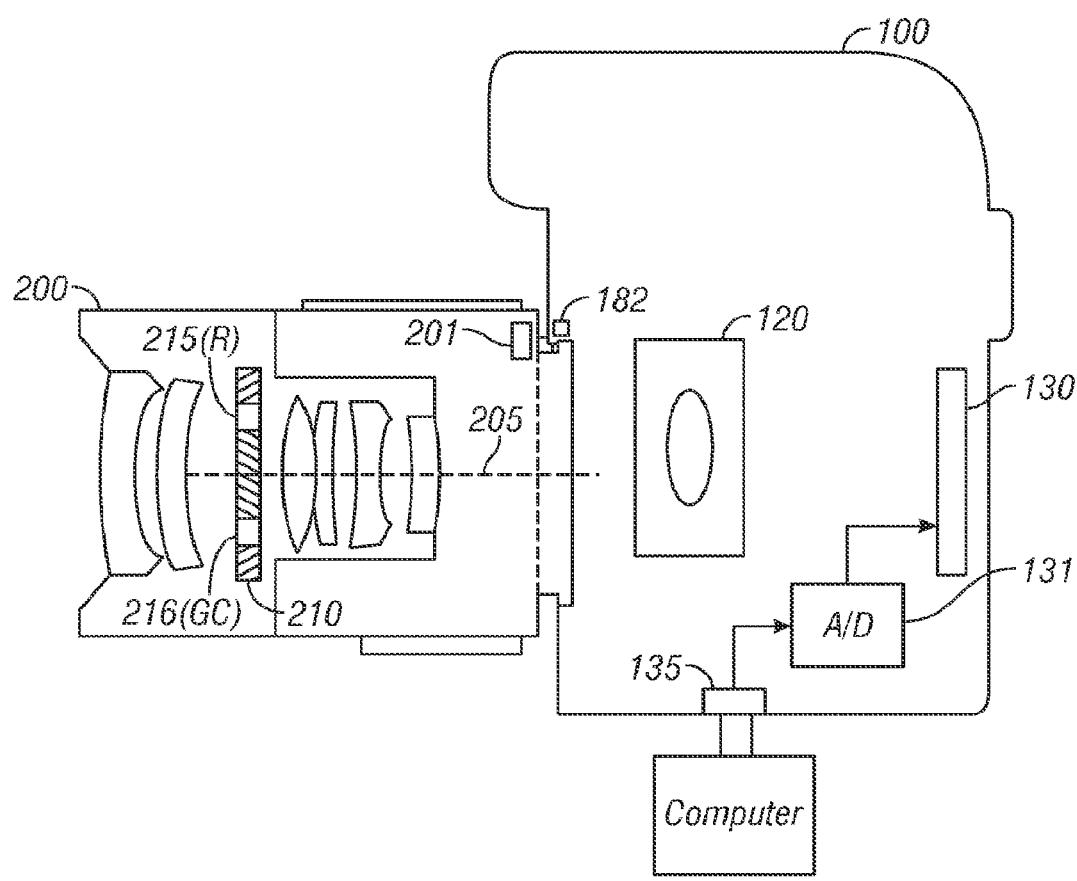
FIG. 2 shows the camera with a special defocus lens assembly on the same body as in FIG. 1, and a computer system.

FIG. 2 shows an alternative embodiment in which a second lands 200 has been attached to the SLR body 100.

The second lens 200 includes, in place of the aperture portion 170, a fixed device 210 which includes at least one channel coded aperture. In the embodiment of FIG. 2, there are two channel coded apertures including a first aperture 215 which is coded as read, and the second aperture 216 which is coded as green. As described herein, these apertures may be encoded in any way with different colors, different polarizations, or different shapes, or any other way of distinguishing between the apertures to form different color channels. More generally, the aperture device of lens 150 is replaced by a disk with apertures formed in the specific pattern used for a defocusing technique, which has fixed, channel coded apertures. In the embodiment, the apertures are located off of the optical axis shown generally as 205. This creates defocused information which is picked up by the image sensor 130.

The lens also may include a lens determination device 201 which indicates that the lens is a defocused obtaining lens.

Object reconstruction can be done with defocusing, which uses two or more off-axis apertures to measure distance from the degree of defocusing of the image. Defocusing causes the images generated by each aperture to be displaced in a rigorously defined manner. See U.S. Pat. No. 7,006,132.

This technique can be implemented with any interchangeable lens camera. The 3D+pose information is encoded by the apertures.

Coding of the aperture(s) is required when using feature matching to measure camera pose. Color coding can be used in one embodiment. For example, three green coded apertures can be placed in a triangular pattern for defocusing with one red and one blue aperture placed on opposite sides for pose.

Alternatively, one blue and one red aperture can be used as shown in FIG. 2.

Other forms of coding can be used—for example, polarization coding, position coding, or shape coding where the different apertures have different shapes.

When used with an appropriate color imaging camera, virtually any camera with interchangeable lenses can be converted into a 3D+pose measurement system when connected to a camera. Because all of the depth and position information is coded in the specially designed aperture, there is very little constraint on the camera. It only needs to have a mount for interchangeable lenses (like C-Mount, Nikon, Canon, or F-Mount), a color sensor, which is found in virtually every camera, and a method for outputting the images in a format that a computer can process. For example, the "raw" output from the camera may be streamed to a computer via USB.

Figure 3:
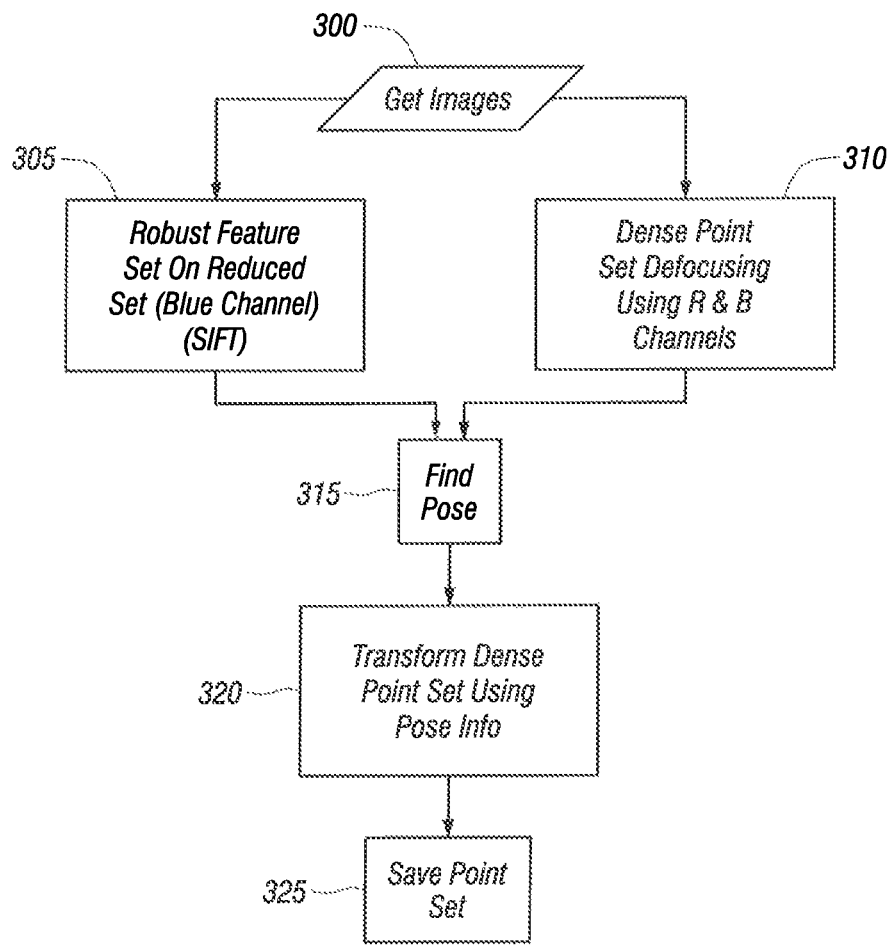
FIG. 3 shows a general flowchart of the operation of the image determination and processing according to an embodiment.

FIG. 3 shows a general flowchart of the operation of the image determination and processing according to an embodiment.

In one embodiment, the imaging may be carried out using painted on features, for example features that are applied using contrast. In an embodiment, a contrast may be used of white and black particles sprayed with an aerosol.

At 300, the system obtains image information at a first time t1. In an embodiment, this can capture multiple images through multiple apertures, in a way that allows distinguishing between the apertures. In the embodiment, color filters are used to separate between the channels, as described above. One of the apertures can be associated with a red filter to only or predominately pass the red light. The other aperture can be associated with a blue filter to only or predominately pass the blue light. This forms two channels of information, one having passed through each of two separated apertures.

According to another embodiment, rather than separating the channels by colors, the apertures are arranged in a specified arrangement such as an equilateral triangle, and the processor 153 recognizes that equilateral triangle in the final image to find the different channels.

According to another embodiment, the different channels can be formed by modifying polarizations of different channels, by putting different polarizations on the different apertures and using those different polarizations as the different channels. The channels can be formed in different ways by providing different physical mask shapes, or by time division changing the aperture e.g. by moving it from place to place.

At 305, robust feature detector is used to determine references on the current image frame using a reduced data set, here the blue channel. Note that the image frame obtained at any one time will be smaller than the overall image frame. The references are referred to herein as being keypoints, but any reference that can be recognized in different images can be used.

The robust feature detector finds two-dimensional information (x, y) of the position of the keypoints as well as a feature vector style descriptor for those keypoints. That feature vector style descriptor will stay constant at any scale rotation and lighting for the points.

The feature vector style descriptor can be obtained by extracting interesting points on the object to provide a "feature description" of the object. This description has enough information that can be used to identify the object when attempting to locate the object in other images containing other objects. The features extracted from the training image are selected to be robust to changes in image scale, noise, illumination, and local geometric distortion to perform reliable recognition. This may use techniques, for example, described in U.S. Pat. No. 6,711,293. The commercially available scale invariant feature transform (SIFT) software can be used for this detection.

Three dimensional point information for each of the keypoints is also determined at 310. This can use, for example, a cross correlating technique for determining 3D information from defocused points within the two channels.

At 315, a map of the different ts is formed. It matches the different parts of the three dimensional information corresponding to the keypoints in order to obtain a transformation T (translation and rotation) between the ts. This finds information indicative of the "pose" of the camera at this time.

At 320, the dense point cloud for each obtained frame to is transformed using the pose information.

At 325, the dense point set is saved.

Although only a few embodiments have been disclosed in detail above, other embodiments are possible and the inventors intend these to be encompassed within this specification. The specification describes specific examples to accomplish a more general goal that may be accomplished in another way. This disclosure is intended to be exemplary, and the claims are intended to cover any modification or alternative which might be predictable to a person having ordinary skill in the art. For example, other forms of processing can be used. Other camera types and mounts besides the specific type herein can be used.

The cameras described herein can be handheld portable units, to machine vision cameras, or underwater units.

Although only a few embodiments have been disclosed in detail above, other embodiments are possible and the inventors intend these to be encompassed within this specification. The specification describes specific examples to accomplish a more general goal that may be accomplished in another way. This disclosure is intended to be exemplary, and the claims are intended to cover any modification or alternative which might be predictable to a person having ordinary skill in the art. For example, other stage operated and operable devices can be controlled in this way including winches and movable trusses, and moving light holders.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments of the invention.

The various illustrative logical blocks, modules, and circuits described in connection with the embodiments disclosed herein, may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. The processor can be part of a computer system that also has a user interface port that communicates with a user interface, and which receives commands entered by a user, has at least one memory (e.g., hard drive or other comparable storage, and random access memory) that stores electronic information including a program that operates under control of the processor and with communication via the user interface port, and a video output that produces its output via any kind of video output format, e.g., VGA, DVI, HDMI, displayport, or any other form.

A processor may also be implemented as a combination of computing devices, e.g., a combination of a DSP and a microprocessor, a plurality of microprocessors, one or more microprocessors in conjunction with a DSP core, or any other such configuration. These devices may also be used to select values for devices as described herein.

The steps of a method or algorithm described in connection with the embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. The memory storage can also be rotating magnetic hard disk drives, optical disk drives, or flash memory based storage drives or other such solid state, magnetic, or optical storage devices. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. The computer readable media can be an article comprising a machine-readable non-transitory tangible medium embodying information indicative of instructions that when performed by one or more machines result in computer implemented operations comprising the actions described throughout this specification.

Operations as described herein can be carried out on or over a website. The website can be operated on a server computer, or operated locally, e.g., by being downloaded to the client computer, or operated via a server farm. The website can be accessed over a mobile phone or a PDA, or on any other client. The website can use HTML code in any form, e.g., MHTML, or XML, and via any form such as cascading style sheets ("CSS") or other.

Also, the inventors intend that only those claims which use the words "means for" are intended to be interpreted under 35 USC 112, sixth paragraph. Moreover, no limitations from the specification are intended to be read into any claims, unless those limitations are expressly included in the claims. The computers described herein may be any kind of computer, either general purpose, or some specific purpose computer such as a workstation. The programs may be written in C, or Java, Brew or any other programming language. The programs may be resident on a storage medium, e.g., magnetic or optical, e.g. the computer hard drive, a removable disk or media such as a memory stick or SD media, or other removable medium. The programs may also be run over a network, for example, with a server or other machine sending signals to the local machine, which allows the local machine to carry out the operations described herein.

Where a specific numerical value is mentioned herein, it should be considered that the value may be increased or decreased by 20%, while still staying within the teachings of the present application, unless some different range is specifically mentioned. Where a specified logical sense is used, the opposite logical sense is also intended to be encompassed.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method comprising:
    at a first time, obtaining a first image with a camera with a first lens assembly attached to an interchangeable lens mount on the camera where the first lens assembly includes a single aperture controllable to open and close in size, and said first image includes information for a two-dimensional image;
    removing the first lens assembly from the interchangeable lens mount;
    attaching a different second lens assembly to the interchangeable lens mount;
    at a plurality of subsequent times, obtaining a plurality of subsequent images with said camera using the different second lens assembly attached to the camera, where the second lens assembly includes an aperture set that is coded such that the plurality of subsequent images includes a plurality of at least two separate image sets which are differentiable from one another;
    producing a plurality of outputs that include information indicative of three-dimensional, defocused information;
    measuring distances between corresponding defocused points in the plurality of at least two separate image sets to determine three-dimensional information about the defocused points;
    cross-correlating the plurality of at least two separate image sets to determine corresponding keypoints in the plurality of at least two separate image sets; and
    determining a transformation using the corresponding keypoints, the transformation being indicative of a pose of the camera.

2. The method of claim 1, further comprising creating a three-dimensional image.

3. The method of claim 1, further comprising, at said first time, controlling said first lens aperture to different aperture amounts.

4. The method of claim 1, wherein said aperture set of said second lens assembly is fixed.

5. The method of claim 4, wherein said aperture set of said second lens assembly includes a first aperture with a first color coding and a second aperture with a second color coding.

6. The method of claim 5, wherein said first color coding is red and said second color coding is blue.

7. The method of claim 1, further comprising communicating between said lens assembly and said camera using a device in said lens assembly to indicate a type of said lens assembly.

8. The method of claim 1, wherein the camera is a single lens reflex (SLR) camera.

9. A system comprising:
    a camera body having a mount capable of receiving one of a plurality of interchangeable lens assemblies, wherein said interchangeable lens assemblies comprise a first lens assembly including a single aperture controllable to open and close in size for two-dimensional imaging, and a second lens assembly adapted to replace the first lens assembly, the second lens assembly including an aperture set that is coded to form a plurality of at least two separate image sets which are differentiable from one another for defocus imaging, and wherein said camera body produces a plurality of outputs that include information indicative of three-dimensional, defocused information; and
    a computer, communicatively coupled to said camera body, said computer being programmed to measure distances between corresponding defocused points in the plurality of at least two separate image sets to determine three-dimensional information about the defocused points, to cross-correlate the plurality of at least two separate image sets to determine corresponding keypoints in the plurality of at least two separate image sets, to determine a transformation using the corresponding keypoints, the transformation being indicative of a pose of the camera, and to create a corresponding three dimensional image.

10. The system of claim 9, wherein said aperture set has a first aperture portion with a first color coding, and a second aperture portion with a second color coding.

11. The system of claim 10, wherein said first color coding is red and said second color coding is blue.

12. The system of claim 9, further comprising a device in said lens that provides information to said camera body indicating a type of said lens.

13. The system of claim 8, wherein the camera body is a single lens reflex (SLR) camera body.

* * * * *